United States Patent
Bishop et al.

(10) Patent No.: US 9,381,679 B2
(45) Date of Patent: Jul. 5, 2016

(54) SYSTEM AND METHOD OF MANUFACTURING A COMPOSITE STRUCTURE IN A CLOSED CAVITY MOLD

(75) Inventors: Stephen K. Bishop, Dallas, TX (US); Robert J. Greenberg, Cedar Hill, TX (US); Forrest W. Henry, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 367 days.

(21) Appl. No.: 13/404,111

(22) Filed: Feb. 24, 2012

(65) Prior Publication Data
US 2013/0221580 A1    Aug. 29, 2013

(51) Int. Cl.
| | | |
|---|---|---|
| *B29C 43/00* | (2006.01) | |
| *B29C 33/20* | (2006.01) | |
| *B29C 70/46* | (2006.01) | |
| *B29C 35/02* | (2006.01) | |
| *B29C 35/08* | (2006.01) | |
| *B29L 31/08* | (2006.01) | |

(52) U.S. Cl.
CPC .............. *B29C 33/20* (2013.01); *B29C 33/202* (2013.01); *B29C 35/02* (2013.01); *B29C 70/46* (2013.01); *B29C 2035/0822* (2013.01); *B29L 2031/082* (2013.01)

(58) Field of Classification Search
CPC ...... B29C 33/20; B29C 33/202; B29C 33/22; B29C 33/24; B29C 2043/3602; B29C 43/361; B27M 3/10; B27M 3/22; A63C 5/12
USPC ........ 425/392, 394, 395, 450.1, 451.2, 451.9, 425/408, 411; 249/166, 167; 144/256.1, 144/269
See application file for complete search history.

(56) References Cited

U.S. PATENT DOCUMENTS

| | | | | | |
|---|---|---|---|---|---|
| 1,004,820 | A | * | 10/1911 | Remy | ............................ 425/394 |
| 1,451,541 | A | * | 4/1923 | Frederick | ................. B27M 3/10 |
| | | | | | 264/294 |
| 1,833,009 | A | * | 11/1931 | Wahl | ............................ 425/34.3 |
| 2,458,864 | A | * | 1/1949 | Lindsay | ......................... 156/224 |

(Continued)

FOREIGN PATENT DOCUMENTS

| | | |
|---|---|---|
| DE | 824677 C | 12/1951 |
| EP | 0482486 A2 | 4/1992 |

(Continued)

OTHER PUBLICATIONS

Office Action in related Canadian patent application No. 2,805,074, dated Jun. 9, 2014.
Canadian Examination Report in related Canadian patent application No. 2,805,074, mailed Aug. 19, 2013, 2 pages.

(Continued)

*Primary Examiner* — Timothy Kennedy
(74) *Attorney, Agent, or Firm* — James E. Walton

(57) ABSTRACT

The present application relates to a method and system that can be utilized to manufacturing composite structures in a closed cavity mold. The tool system includes a closed cavity tool with spring members that when in compression apply pressure to a preform located within the closed cavity mold. During a curing cycle, the spring members provide substantially constant pressure to the preform, thereby preventing voids and porosity in the cured composite structure. Further, the substantially constant pressure, provided by the spring members, acts to more effectively conform the preform to the geometry defined by a void in the closed cavity mold during the curing cycle.

7 Claims, 4 Drawing Sheets

(56) References Cited

U.S. PATENT DOCUMENTS 3,167,129 A * 1/1965 Shultz .................. 416/226
3,611,506 A 10/1971 Schroeder
4,961,700 A 10/1990 Dunbar

FOREIGN PATENT DOCUMENTS

| FR | 926596 A | 10/1947 |
| FR | 939646 A | 11/1948 |
| FR | 1090006 A | 3/1955 |
| GB | 1323470 A | 7/1973 |
| WO | 8701649 A1 | 3/1987 |

OTHER PUBLICATIONS

Extended European Search Report in related European patent application No. 12161919, 7 pages, mailed Apr. 2, 2014.
Office Action dated Apr. 23, 2015 from counterpart EP App. No. 12161919.1.
Office Action dated Dec. 3, 2014 from counterpart CN App. No. 201310026389.2.
Office Action dated Jul. 9, 2015 from counterpart EP App. No. 12161919.1.
Office Action dated Oct. 22, 2014 from counterpart EP App. No. 12161919.1.
Office Action dated Aug. 27, 2015 from counterpart CN App. No. 201310026389.2.

* cited by examiner

SYSTEM AND METHOD OF MANUFACTURING A COMPOSITE STRUCTURE IN A CLOSED CAVITY MOLD

BACKGROUND

1. Technical Field

The present application relates in general to composite systems. More specifically, the present application relates to a method and system of manufacturing a composite structure in a closed cavity mold. The system and method of the present application are well suited for manufacturing composite parts for use in an aircraft; however, the system and method of the present application can be used to manufacture composite parts for use in a wide variety of industries.

2. Description of Related Art

The structural integrity of composite structures is partly dependent upon a consistency of the matrix of load bearing fibers in the risen binder. For example, a void, contour variation, or other defect in the cured composite structure is highly undesirable as the defect can cause the composite structure to fail and/or suffer a reduction in performance. Further, the likelihood of defects can cause extensive examination of each cured composite structure to verify that a defect does not exist. Although, there have been significant developments in composite systems and manufacturing techniques, defects in composite structures routinely occur. Furthermore, there is a need for a system and method for reducing voids and other defects when manufacturing a composite structure in a closed cavity mold.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

DESCRIPTION OF THE PREFERRED EMBODIMENT

Illustrative embodiments of the system and method of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
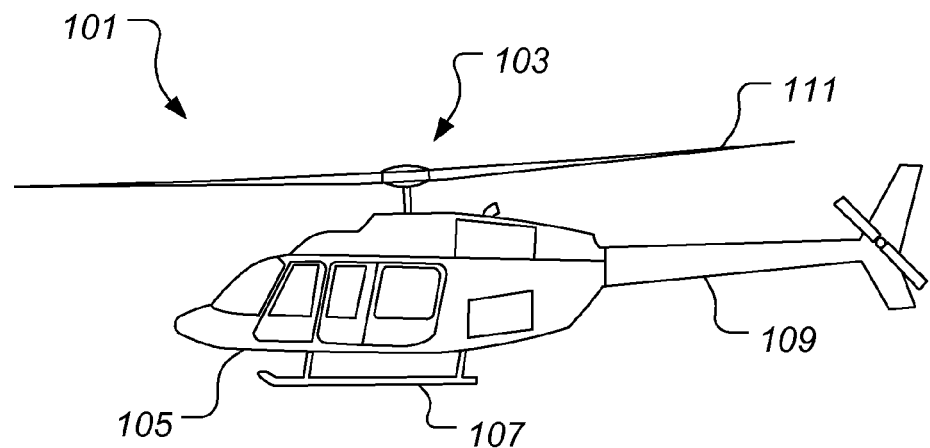
FIG. 1 is a side view of a rotorcraft, according to an embodiment of the present application.

Referring to FIG. 1 in the drawings, a rotorcraft 101 is illustrated. Rotorcraft 101 has a rotor system 103 with a plurality of rotor blades 111. The pitch of each rotor blade 111 can be selectively controlled in order to selectively control direction, thrust, and lift of rotorcraft 101. Rotorcraft 101 further includes a fuselage 105, landing gear 107, and an empennage 109.

Figure 2:
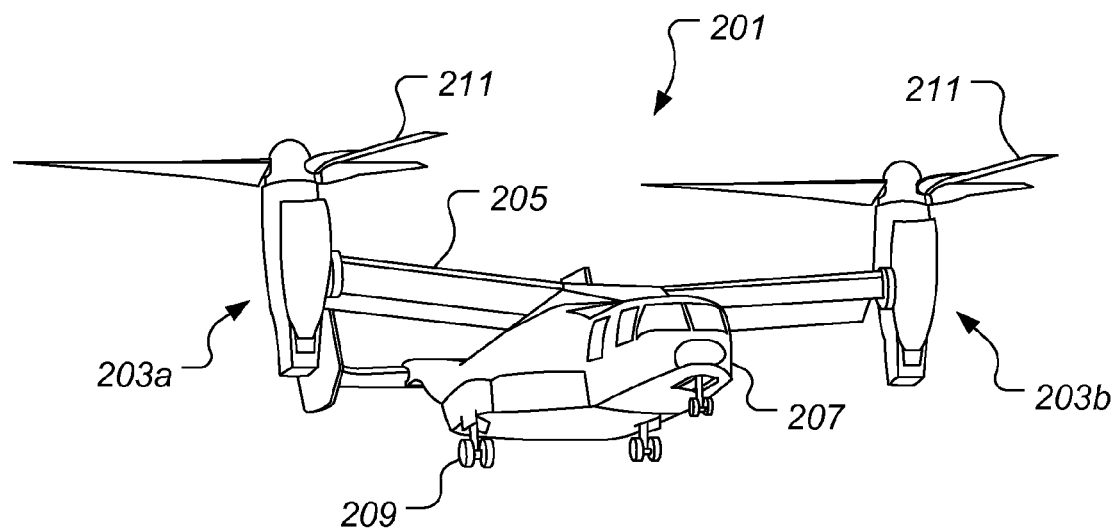
FIG. 2 is a perspective view of a tilt rotor aircraft, according to an embodiment of the present application.

Referring to FIG. 2 in the drawings, a tiltrotor aircraft 201 is illustrated. Tiltrotor aircraft 201 includes a fuselage 207, a landing gear 209, a wing 209, and rotatable nacelles 203*a* and 203*b*. Each nacelle 203*a* and 203*b* includes a plurality of rotor blades 211. The position of nacelles 203*a* and 203*b*, as well as the pitch of rotor blades 211, can be selectively controlled in order to selectively control direction, thrust, and lift of tiltrotor aircraft 201.

It is especially desirable for components of rotorcraft 101 and tiltrotor aircraft 201 to be manufactured with composite systems since composite components are typically very weight efficient. Illustrative composite components can include: wings, blades, spars, rotor grips, compartments, flooring, to name a few. As such, the system and method of the present application may be utilized to manufacture composite components for rotorcraft 101 and tiltrotor aircraft 201, as well as other aircraft.

The system and method of the present application can be utilized to manufacturing composite structures in a closed cavity mold. Conventional closed cavity mold manufacturing methods have significant limitations and shortcomings. For example, curing a composite structure in a closed cavity mold with ambient temperature and pressure typically results in poor cross-link density, high porosity, and substantial part variation. Further, relying upon an autoclave for both temperature and pressure is limiting, expensive, resource-consuming. Further, curing a composite structure in a closed cavity mold with a hydraulic press to create pressure has temperature constraints, lacks portability, and is undesirably expensive. Further, conventional clamping of a closed cavity mold can promote the formation of voids and porosity, and further lack the ability to accurately generate extreme contours in the composite structure. However, the system and method of the present application is configured to provide a substantially constant pressure to a composite structure during the curing cycle, thereby substantially preventing the formation of voids, while also more accurately generating contour profiles of the composite structure. Further, the system and method of the present application is particularly well suited for heating of the composite structure during the curing cycle by a wide variety of heating configurations. These and other advantages of the system and method of the present application are discussed further herein.

It should be appreciated that the system and method of the present application may be utilized to manufacture composite components on other types of aircraft, as well as non-aircraft applications. For example, the system and method of the present application may be utilized to manufacture composite components on a wind turbine, space vehicle, ground vehicle, surface marine vehicle, amphibious marine vehicle, and submersible marine vehicle, to name a few examples.

Figure 3:
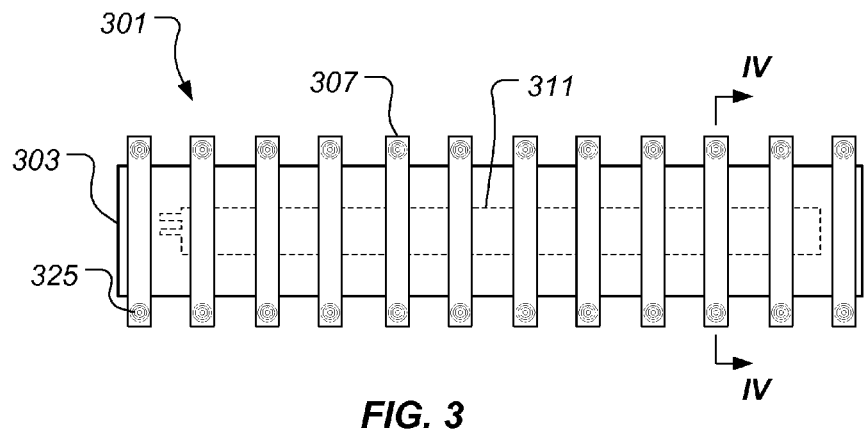
FIG. 3 is a top view of a tooling system, according to the preferred embodiment of the present application.
Figure 4:
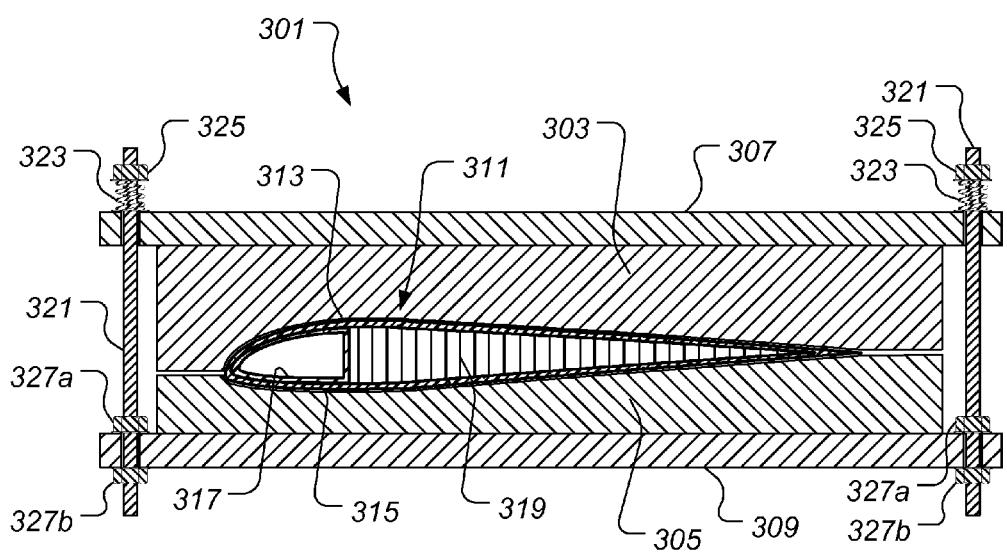
FIG. 4 is a cross-sectional view of the tooling system, taken at section lines IV-IV, according to the preferred embodiment of the present application.

Referring to FIGS. 3 and 4, a spring biased tooling system 301, according to the preferred embodiment is illustrated. Tooling system 301 includes an upper mold 303 and a lower mold 305. The interior surfaces of upper mold 303 and lower mold 305 collectively form a void having the desired an outer mold line geometry of a composite structure 311 being molded by the tooling system 301. In the illustrated embodiment, the composite structure 311 is a rotor blade, such as rotor blade 211 depicted in FIG. 2. The illustrated composite structure 311 includes an upper skin 313, a lower skin 315, a spar 317, and a core 319 that are bonded together during a curing process. It should be appreciated that the illustrated rotor blade is merely exemplary of a wide range of composite structures that can be formed by tooling system 301.

Tooling system 301 further includes a plurality of upper adapters 307 and lower adapters 309. Each upper adapter 307 and lower adapter 309 is a rigid member configured to transfer compressive forces generated by a plurality of springs 323 to upper mold 303 and lower mold 305. Tooling system 301 further includes a plurality of rods 321, each rod 321 being coupled to lower adapter 309 with nuts 327a and 327b. Each spring 323 is located between an upper surface of upper mold 303 and a nut 325. Rod 321 is preferably threaded such that nut 325 can be threaded onto rod 321 to an implementation specific torque and depth. One or more washers can be used to provide bearing surfaces between nut 325 and spring 323, as well as between spring 323 and upper adapter 307. Furthermore, one or more washers can be used between lower adapter 309 and nuts 327a, 327b.

Compression derived from springs 323 provides substantially constant pressure to composite structure 311 during resin shrinkage and mold settling that can occur during the curing cycle, thereby preventing the development of voids and porosity in composite structure 311. Components of tooling system 301 can be installed exterior to upper mold 303 and lower mold 305, thereby making tooling system 301 conveniently retrofitable onto existing closed cavity tooling. In the preferred embodiment, each spring 323 is a die-spring having the capability to produce approximately 1800 pounds-force; however, it should be fully appreciated that the exact size and force producing capability of springs 323 is implementation specific. Further, each nut 325 can be selectively torqued to provide the desired amount of compression of upper mold 303 and lower mold 305.

Figure 5:
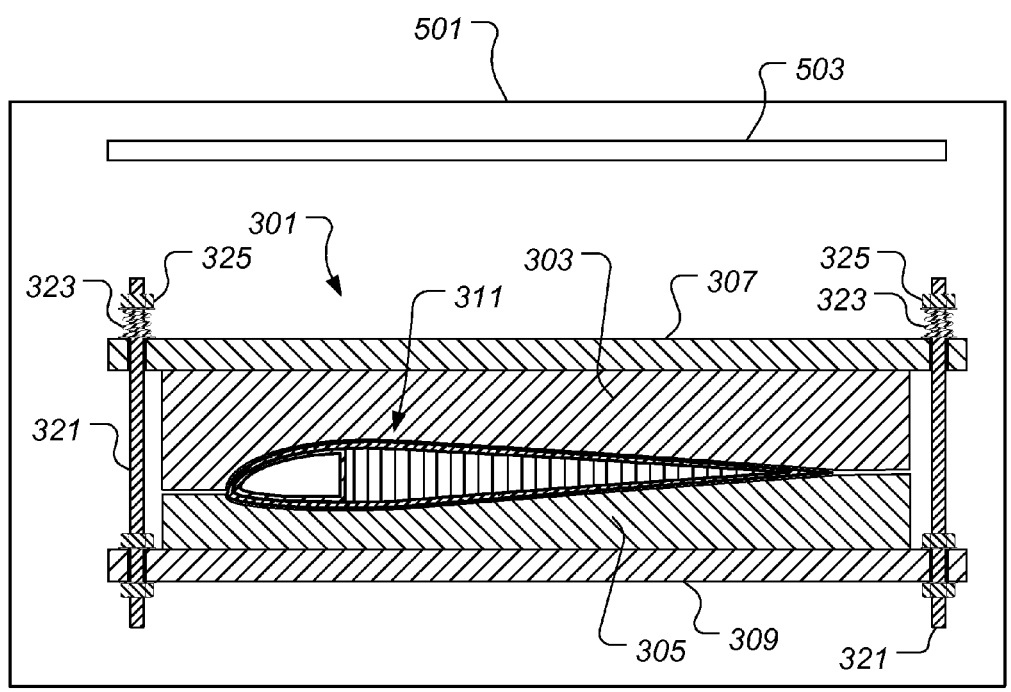
FIG. 5 is schematic view of a the tooling system in an oven, according to the preferred embodiment of the present application.

One unique advantage of tooling system 301 with springs 323 to provide compression of upper mold 303 and lower mold 305 is that the tooling system 301 is capable of withstanding and tolerating a variety of heating environments. Referring now also to FIG. 5, an oven 501 with a heating element 503 is illustrated. Oven 501 is one exemplary heating environment for which tooling system 301 is particularly well suited for. In contrast, conventional methods of compressing a closed cavity tool, such as a hydraulic system, are highly susceptible to leakage when subjected to heat within oven 501. Heat generated within oven 501 promotes viscous flow and subsequent curing of resin and/or adhesive within composite structure 311. It should be fully appreciated that it is contemplated that other heating system and methods maybe used during the curing cycle. For example, heating blankets, radiant heat systems, and other non-pressurized heating systems can be used in lieu of oven 501. Furthermore, an autoclave can be used; however, tooling system 301 is particularly well suited for using non-pressurized heating system that avoids the limitations and expense associated with curing in an autoclave. Further, composite structure 311 can employ a resin system that uses a catalyst, such as heat, ultraviolet rays (UV), to kick-off a reaction that results in the viscous changes and subsequent curing of the resin. Further, composite structure 311 can employ a thermal decomposition resin system that similarly uses a catalyst to kick-off a chemical reaction during the curing cycle.

Figure 6:
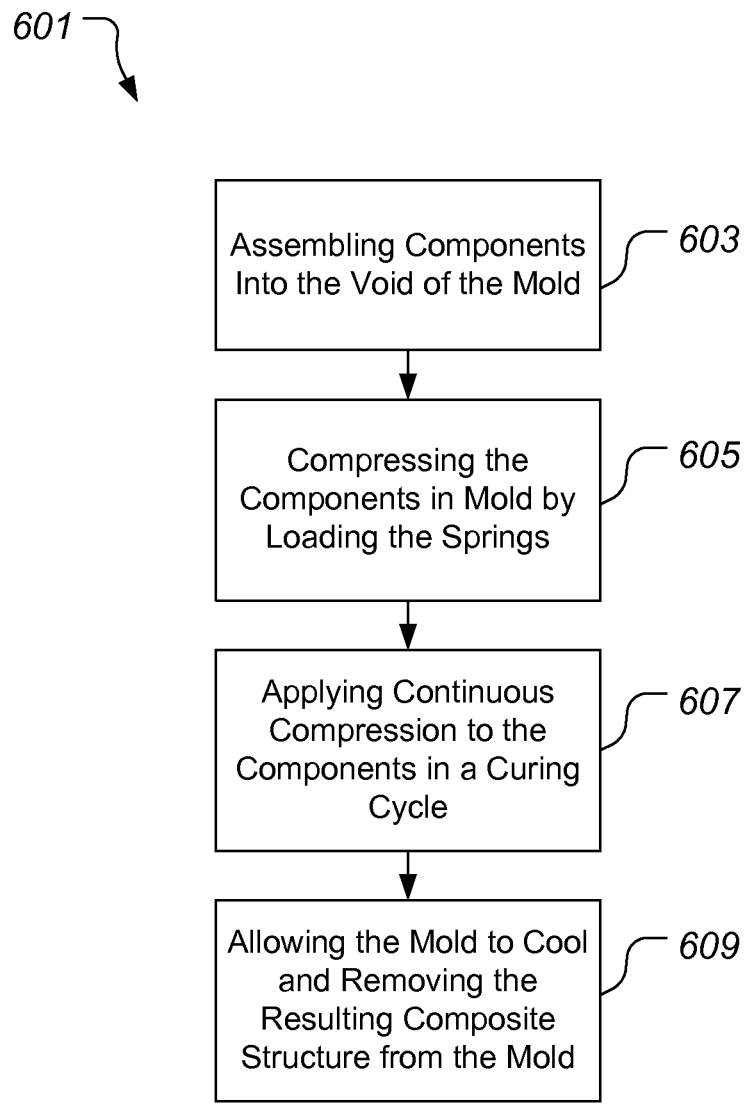
FIG. 6 is a diagram of a method of manufacturing a composite structure, according to the preferred embodiment of the present application.

Referring now also to FIG. 6, a method 601 for manufacturing a composite structure in spring biased tooling system 301 is schematically illustrated. Method 601 includes a step 603 for assembling components of composite structure 311 into the void formed by upper mold 303 and lower mold 305. The components can include non-composite components, such as a metal component, as well as composite components. The composite components of composite structure 311 can include any variety of uncured and cured components formed with any variety of composite fiber/resin systems. For example, an uncured composite component can be a preform of "pre-preg" composite strips which include one or more layers of fibers pre-impregnated with an uncured resin system. Furthermore, an adhesive or other resinous material can be used as a bonding agent between components within the void formed by upper mold 303 and lower mold 305.

Method 601 further includes a step 605, which involves compressing the components within the void formed by upper mold 303 and lower mold 305. In the preferred embodiment, springs 323 perform the function of compressing upper mold 303 and lower mold 305 together. Each spring 323 is compressed by a nut 325. The compressive force of each spring is selectively controlled by selectively torque each nut to a desired torque level. For example, in the illustrated embodiment, each nut 325 is torqued to approximately 130 foot-pounds; however, it should be appreciated that the exact torque level of each nut 325 is implementation specific.

Method 601 further includes a step 607, which involves applying continuous compression to the components within the upper mold 303 and lower mold 305 during a curing cycle. In the preferred embodiment, the curing cycle involves subjecting the components to heat and pressure for a designated amount of time. In an alternative embodiment, the curing cycle does not include actively applying heat, rather the curing cycle involves curing at ambient temperature. In the preferred embodiment, the pressure is created by springs 323, while the heat is generated by an oven. As discussed further herein, the heat can be generated by any variety of sources. During the curing cycle, the resinous material, such as an adhesive, impregnated resin, or the like, becomes viscous allowing the pressure created by springs 323 to compress and compact the components. As the components compress, springs 323 provide the critical function of continually applying pressure throughout the curing process to prevent the formation of voids, or other defect that may result from lack of pressure. More specifically, as upper mold 303 and lower mold 305 settle and move together, springs 323 extend to take-up distance so that pressure is maintained. Further, not only does springs 323 provide and maintain pressure to the components to prevent formation of voids, but also ensure proper pressurized contact with the inner surfaces of the molds, so that the resultant composite structure 311 has the desired outer mold line geometry and contour.

Method 601 further includes a step 609, which involves allowing the mold to cool and removing the resulting composite structure from the mold. After the curing of the components in step 607, a resulting composite structure is formed. However, the mold and composite structure are allowed to return to ambient temperature prior to disassembly.

The system and method of the present application provide significant advantages over conventional composite manufacturing practices. For example, the system and method of the present application provide for springs to apply substantially constant clamping pressure to the composite assembly during the curing cycle, without having to rely upon a hydraulic press, autoclave, or the like. Further, the system and method can reduce the capital expense that may otherwise be required for a conventional tooling and process. Further, the system and method compensate for mold settling and resin shrinkage that may otherwise result in a pressure loss during the curing cycle, thereby preventing development of voids and porosity in the cured composite structure. Further, the system and method produce composite structures that more closely match the desired shape, such as rotor blade twist and contour. Further, the system and method are particularly well suited for curing in an ambient pressure environment, thereby avoiding the expense and location restrictions associated with relying on an autoclave for application of pressure. Further, the system and method permit the transport of the tooling system to alternative facilities since presses and autoclaves, which are cumbersome to transport, are not required. Further, the system and method allow for pressure to be supplied by springs in an ambient pressure environment, as such, ambient pressure changes due to weather and location are dominated by the pressure generated by the springs, thereby producing parts that do not vary with changes in ambient pressure.

The particular embodiments disclosed above are illustrative only, as the application may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the application. Accordingly, the protection sought herein is as set forth in the claims below. It is apparent that a system with significant advantages has been described and illustrated. Although the system of the present application is shown in a limited number of forms, it is not limited to just these forms, but is amenable to various changes and modifications without departing from the spirit thereof.

The invention claimed is:

1. A tooling system for manufacturing a composite structure, the tooling system comprising:
   an upper mold and a lower mold, the upper mold and the lower mold collectively forming a void, the void being configured to accept a preform;
   a plurality of spring members configured to apply pressure to the preform during a curing cycle;
   a plurality of upper adapters adjacent to the upper mold and a plurality of lower adapters adjacent to the lower mold, each upper adapter and lower adapter being a rigid member configured to transfer compressive forces generated by the plurality of spring members to the upper and the lower mold; and
   a plurality of rod members,
   wherein each of the plurality of upper adapters is coupled to a respective one of the plurality of lower adapters by at least two of the plurality of rod members, wherein each of the at least two rod members extends through a respective one of the plurality of spring members.

2. The tooling system according to claim 1 wherein each of the plurality of rod members is threaded and extends through a respective nut.

3. The tooling system according to claim 1, wherein the void geometry is configured for manufacturing of a rotor blade.

4. The tooling system according to claim 1, wherein the pressure generated by each spring member is selectively controllable by selectively applying a torque to a respective nut.

5. The tooling system according to claim 1, further comprising:
   an oven configured to apply a heat during a curing cycle, the oven being non-pressurized.

6. The tooling system according to claim 1, wherein each spring member is configured to apply a respective amount of pressure to the preform during the curing cycle, even when the preform compacts during the curing cycle.

7. The tooling system according to claim 1, wherein each spring member is capable of producing 1800 pounds-force in compression.

* * * * *